(12) United States Patent
Bartley et al.

(10) Patent No.: US 6,846,783 B2
(45) Date of Patent: Jan. 25, 2005

(54) ACYLATIGN AGENTS AND DISPERSANTS FOR LUBRICATING OIL AND FUELS

(75) Inventors: Stuart L. Bartley, Wickliffe, OH (US); James D. Burrington, Mayfield Village, OH (US); Richard Yodice, Mentor, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 10/312,678

(22) PCT Filed: Jun. 21, 2001

(86) PCT No.: PCT/US01/19816
§ 371 (c)(1),
(2), (4) Date: Dec. 18, 2002

(87) PCT Pub. No.: WO01/98439
PCT Pub. Date: Dec. 27, 2001

(65) Prior Publication Data
US 2004/0220060 A1 Nov. 4, 2004

Related U.S. Application Data
(60) Provisional application No. 60/213,347, filed on Jun. 22, 2000.

(51) Int. Cl.$^7$ .................. C10M 159/12; C10M 129/93; C10M 129/95; C10L 1/18; C10L 1/22
(52) U.S. Cl. ...................... 508/452; 508/453; 508/454; 44/386
(58) Field of Search ............................... 508/452, 453, 508/454, 364; 44/386

(56) References Cited

U.S. PATENT DOCUMENTS

| | | | |
|---|---|---|---|
| 2,212,506 A | 8/1940 | Bachman | 260/485 |
| 2,264,354 A | 12/1941 | Alder et al. | 260/464 |
| 2,293,309 A | 8/1942 | Robin, Jr. et al. | 167/22 |
| 3,197,318 A | 7/1965 | Halpern et al. | 106/208 |
| 3,755,169 A | 8/1973 | Adams et al. | 252/35 |
| 3,868,330 A | 2/1975 | Meinhardt et al. | 252/33.6 |
| 3,981,845 A | 9/1976 | Renner | 260/69 R |
| 4,049,698 A | 9/1977 | Hawkins et al. | 560/127 |
| 4,145,503 A | 3/1979 | Emmons et al. | 526/282 |
| 4,147,864 A | 4/1979 | Woodward et al. | 544/16 |
| 4,161,452 A | 7/1979 | Stambaugh et al. | 252/34 |
| 4,330,459 A | 5/1982 | Takahashi et al. | 523/148 |
| 4,385,656 A | 5/1983 | Takahashi et al. | 164/525 |
| 4,456,454 A | 6/1984 | Jenkins, Jr. | 44/73 |
| 4,769,464 A | 9/1988 | Sajtos | 546/314 |
| 5,234,612 A | 8/1993 | Carlisle | 252/51.5 R |
| 5,508,424 A | 4/1996 | Carmosin et al. | 546/281 |
| 5,681,506 A | 10/1997 | Pragnell et al. | 252/405 |
| 5,721,248 A | 2/1998 | Straub et al. | 514/314 |
| 5,726,266 A | * 3/1998 | Faul et al. | 526/266 |
| 5,736,492 A | 4/1998 | Clark et al. | 508/485 |
| 5,856,279 A | * 1/1999 | Baker | 508/222 |
| 6,133,206 A | * 10/2000 | Gracey et al. | 508/221 |
| 6,147,036 A | * 11/2000 | Baker | 508/454 |

FOREIGN PATENT DOCUMENTS

| | | |
|---|---|---|
| DE | 195 08 656 A1 | 9/1996 |
| DE | 196 16 569 A1 | 10/1997 |
| EP | 0 212 859 A2 | 3/1987 |
| EP | 0 823 471 A1 | 2/1998 |
| EP | 0 889 113 A2 | 1/1999 |
| WO | WO 95/25755 | 9/1995 |
| WO | WO 01/98440 A2 | 12/2001 |

OTHER PUBLICATIONS

"1,3–Dipolar Cycloadditions, Part 27.= The Two Modes of Addition of Nitrones to Methyl Acrylate and to Methyl Acrylate and to Trimethyl Ethylenetricarboxylate" Joucla, Marc and Hamelin, Jac, (J. Chem.Research (S), 1978, 276–277).

(List continued on next page.)

*Primary Examiner*—Jerry D. Johnson
(74) *Attorney, Agent, or Firm*—Samuel B. Laferty; Michael F. Esposito

(57) ABSTRACT

Hydrocarbyl substituted carboxylic compositions and derivatives thereof useful as additives for lubricating oil and fuel compositions. Carboxylic composition are derived from (A) an olefinically unsaturated hydrocarbon, said hydrocarbon having at least one allylic hydrogen atom, and (B) an α,β-unsaturated carboxylic compound prepared by reacting (1) an active methylene compound of the formula

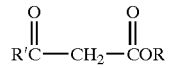

and (2) a carbonyl compound of the general formula

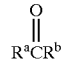

wherein $R^a$ is H or hydrocarbyl and $R^b$ is a member of the group consisting of H, hydrocarbyl and

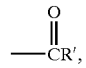

wherein each R' is independently R or OR and each R is, independently, H or a hydrocarbyl group; and lower alkyl acetals, ketals, hemiacetals and hemiketals of the carbonyl compound (2). Carboxylic derivative compositions are obtained by reacting the carboxylic compositions with a reactant selected from the group consisting of (a) amines characterized by the presence within their structure of at least one condensable H—N< group, (b) alcohols, (c) reactive metal or reactive metal compounds, and (d) a combination of two or more of any of (a) through (c), the components of (d) being reacted with the carboxylic composition simultaneously or sequentially, in any order.

31 Claims, No Drawings

OTHER PUBLICATIONS

"Reactions related to the aldol condensation", Morrison, Robert Thornton and Boyd, Robert Neilson, Professors of Chemistry, NY Univ., (Organic Chemistry, Second Ed., Ch. 27.11, p. 869–870, Allyn and Bacon, Inc., Boston, MA 1959).

"Functional derivatives of carbonic acid", Morrison, Robert Thornton and Boyd, Robert Nelson, Professors of Chemistry, NY Univ., (Organic Chemistry, Second Ed., Ch. 29.9, p. 921, Allyn and Bacon, Inc., Boston, MA 1959).

"Reduction of pyridine", Morrison, Robert Thornton and Boyd, Robert Nelson, Professors of Chemistry, NY Univ., (Organic Chemistry, Second Ed., Ch. 36.12, p. 1089, Allyn and Bacon, Inc., Boston, MA, 1959).

"A New Synthesis of α–Amino Acids–III", Ben–Ishai, D., Altman, J. Bernstein, Z. and Peled, N., Dept. of Chemistry, Technol–Israel Inst. Of Tech., Haifa, Israel (Tetrahedron, vol. 34, pp. 467–473, Pergamon Press, Great Britain 1978).

"A New Super–Electrophile: α–(Phenylsulfonyl)maleic Anhydride", Ramezanian, Merrikh, Abdelklader, Mohamed, Padias, Anne Buyle, Hall, Jr., H.K. and Brois, Stanely J., (Org. Chem., 54, p. 2852, Amer. Chem. Society 1989).

"Intramolecular Reactions of 1–Allyic 2,2–Dimethyl Ethylenetricarboxylates", Snider, Barry B., Roush, David M. and Killinger, Thomas A., Dept. of Chemistry, Princeton University, (Journal of American Chemical Society, (pp. 6023–6027, Amer. Chem. Society 1979).

"The Knoevenagel Condensation of O,S–and S,S–Diethyl Malonates and Ethyl Pyruvate", Wilk, Bogdan K., Dept. of Chemistry, University of Pittsburgh, Pittsburgh, PA, (Tetrahedron, vol. 53, No. 21, pp. 7097–7100, Elsevier Science Ltd., Great Britain 1997).

"New Copolymers from electrophilic trisustituted ethylenes and electron–rich vinyl comonomers", Hall, Jr., H.K. and Righettini, R.F., Chemistry Dept. C.S. Marvel Laboratories, University of Arizon, Tucson, AZ (Polymer Bulletin 16, 405–409, Springer–Verlag 1986).

"Synthesis and Reactions of α–Carbomethoxy–N–Phenylmaleimide and Related Electrophilic Ethylenes", Evans, Stacy B., Abdelkader, Mohamed, Padias, Anne Buyle, and Hall, Jr., H.K., C.S. Marvel Laboratories, Dept. of Chemistry, University of Arizona, Tucson, AZ (JO.Chem., 54, 2846–2852, Amer. Chem. Society 1989).

"Electron–Deficient Trisubstituted Olefins. A New Class of Reactive Comonomers", Hall, H.K. and Daly, Robert C., Dept. of Chemistry, University of Arizona, Tucson, AZ, (vol. 7, No. 1, Jan. Feb. 1975, pp. 22–31).

* cited by examiner

ACYLATIGN AGENTS AND DISPERSANTS FOR LUBRICATING OIL AND FUELS

This application claims the benefit of Provisionsl Application No. 60/213,347, filed Jun. 22, 2000.

FIELD OF THE INVENTION

This invention relates to hydrocarbyl substituted carboxylic compositions and derivatives prepared therefrom. The carboxylic compositions and derivatives are useful as detergents and dispersants for lubricating oil and fuel compositions.

BACKGROUND OF THE INVENTION

Numerous types of additives are used to improve lubricating oil and fuel compositions. Such additives include, but are not limited to dispersants and detergents of the ashless and ash-containing variety, oxidation inhibitors, anti-wear additives, friction modifiers, and the like. Such materials are well known in the art and are described in many publications, for example, Smalheer, et al, "Lubricant Additives", Lezius-Hiles Co., Cleveland, Ohio, USA (1967); M. W. Ranney, Ed., "Lubricant Additives", Noyes Data Corp., Park Ridge, N.J., USA (1973); M. J. Satriana, Ed., "Synthetic Oils and Lubricant Additives, Advances since 1977", Noyes Data Corp., Park Ridge N.J., USA (1982), W. C. Gergel, "Lubricant Additive Chemistry", Publication 694-320-65R1 of the Lubrizol Corp., Wickliffe, Ohio, USA (1994); and W. C. Gergel et al, "Lubrication Theory and Practice" Publication 794-320-59R3 of the Lubrizol Corp., Wickliffe, Ohio, USA (1994); and in numerous United States patents, for example Chamberlin, III, U.S. Pat. No. 4,326,972, Schroeck et al, U.S. Pat. No. 4,904,401, and Ripple et al, U.S. Pat. No. 4,981,602.

Many such additives are derived from carboxylic reactants, for example, acids, esters, anhydrides, lactones, and others. Specific examples of commonly used carboxylic compounds used as intermediates for preparing lubricating oil additives include alkyl-and alkenyl substituted succinic acids and anhydrides, polyolefin substituted carboxylic acids, aromatic acids, such as salicylic acids, and others. Illustrative carboxylic compounds are described in Meinhardt, et al, U.S. Pat. No. 4,234,435; Norman et al, U.S. Pat. No. 3,172,872; LeSuer et al, U.S. Pat. No. 3,454,607, and Rense, U.S. Pat. No. 3,215,707.

Such carboxylic acids can be prepared by thermally reacting an aliphatic hydrocarbon or halogenated aliphatic hydrocarbon with unsaturated acids or acid derivatives at temperatures above about 200° C. The hydrocarbon typically is an olefin polymer such as polypropene or polybutene having number average molecular weights generally above 200. The rate of conversion of such reactions, however, is low and attempts to improve the conversion rate by increasing the reaction temperature and/or using super-atmospheric pressure results in degradation of maleic anhydride to carbon dioxide, water and tar-like solids Many carboxylic intermediates used in the preparation of lubricating oil additives contain chlorine. One technique which has been used for improving the conversion rate, particularly when using aliphatic hydrocarbon alkylating agents, involves carrying out the reaction in the presence of chlorine. In some instances, high temperatures and long reaction times still are required.

While the amount of chlorine present is often only a small fraction of the total weight of the intermediate, the chlorine frequently is carried over into the carboxylic derivative which is desired as an additive. For a variety of reasons, including environmental reasons, the industry has been making efforts to reduce or to eliminate chlorine from additives designed for use as lubricant or fuel additives. The matter of chlorine content in additives is discussed in numerous patents including U.S. Pat. Nos. 5,356,552; 5,370,805; 5,445,657 and 5,454,964.

Accordingly, it is desirable to provide low chlorine or chlorine free additives for use in lubricants and fuels. While hydrocarbyl group substituted carboxylic compositions of this invention may be prepared employing the use of added chlorine during the reaction, the (α,β-unsaturated carboxylic compounds used to prepare the carboxylic compositions tend to react more readily, and with less attendant generation of tar and other decomposition products than previously employed unsaturated carboxylic compounds such as maleic anhydride.

In industry, it is also desirable to have available a wide variety of reactants available to prepare compositions. Materials shortages, costs, etc. contribute to uncertainties in the industry. These uncertainties can be relieved when more than a limited number of types raw materials are available to a manufacturer. The compositions of this invention are prepared employing raw materials that are different from, and are not suggested by, traditionally used raw materials.

SUMMARY OF THE INVENTION

This invention relates to carboxylic compositions and derivatives thereof. The carboxylic compositions are useful as intermediates for preparing derivatives for use as lubricant and fuel additives. Both the carboxylic compositions and the derivatives thereof find utility as additives for lubricating oil and fuel compositions. Hydrocarbyl group substituted carboxylic composition are derived from (A) an olefinically unsaturated hydrocarbon, said hydrocarbon having at least one allylic hydrogen atom, and (B) an α,β-unsaturated carboxylic compound prepared by reacting (1) an active methylene compound of the formula

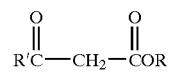

and (2) a carbonyl compound of the general formula

wherein $R^a$ is H or hydrocarbyl and $R^b$ is a member of the group consisting of H, hydrocarbyl and

wherein each R' is independently R or OR and each R is, independently, H or a hydrocarbyl group; and lower alkyl acetals, ketals, hemiacetals and hemiketals of the carbonyl compound (2). Carboxylic derivative compositions are obtained by reacting the hydrocarbyl substituted carboxylic compositions with a reactant selected from the group consisting of (a) amines characterized by the presence within their structure of at least one condensable H—N< group, (b) alcohols, (c) reactive metal or reactive metal compounds, and (d) a combination of two or more of any of (a) through (c), the components of (d) bring reacted with the hydrocarbyl substituted carboxylic composition simultaneously or sequentially, in any order.

DETAILED DESCRIPTION OF THE PREFERRED EMBODIMENTS

As used herein, the terms "hydrocarbon", "hydrocarbyl" or "hydrocarbon based" mean that the group being described has predominantly hydrocarbon character within the context of this invention. These include groups that are purely hydrocarbon in nature, that is, they contain only carbon and hydrogen. They may also include groups containing substituents or atoms which do not alter the predominantly hydrocarbon character of the group. Such substituents may include halo-, alkoxy-, nitro-, etc. These groups also may contain hetero atoms. Suitable hetero atoms will be apparent to those skilled in the art and include, for example, sulfur, nitrogen and oxygen. Therefore, while remaining predominantly hydrocarbon in character within the context of this invention, these groups may contain atoms other than carbon present in a chain or ring otherwise composed of carbon atoms.

In general, no more than about three non-hydrocarbon substituents or hetero atoms, and preferably no more than one, will be present for every 10 carbon atoms in the hydrocarbon or hydrocarbon based groups. Most preferably, the groups are purely hydrocarbon in nature, that is they are essentially fire of atoms other than carbon and hydrogen.

Throughout the specification and claims the expression oil soluble or dispersible is used. By oil soluble or dispersible is meant that an amount needed to provide the desired level of activity or performance can be incorporated by being dissolved, dispersed or suspended in an oil of lubricating viscosity. Usually, this means that at least about 0.001% by weight of the material can be incorporated in a lubricating oil composition. For a further discussion of the terms oil soluble and dispersible, particularly "stably dispersible", see U.S. Pat. No. 4,320,019 which is expressly incorporated herein by reference for relevant teachings in this regard.

It must be noted that as used in this specification and appended claims, the singular forms also include the plural unless the context clearly dictates otherwise. Thus the singular forms "a", "an", and "the" include. the plural; for example "an amine" includes mixtures of amines of the same type. As another example the singular form "amine" is intended to include both singular and plural unless the context clearly indicates otherwise.

Olefinically Unsaturated Hydrocarbon

The hydrocarbyl group substituted carboxylic compositions of this invention are derived from olefinically unsaturated hydrocarbons having at least one allylic hydrogen atom. As used herein, the term allylic hydrogen atom refers to a hydrogen atom on a saturated aliphatic carbon atom alpha to an olefinic double bond, i.e., the hydrogen atom in the group of formula

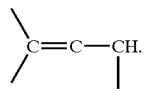

The olefinically unsaturated hydrocarbon typically contains at least about 8 carbon atoms, often at least about 30 carbon atoms and preferably at least about 50 carbon atoms, up to about 800, frequently up to about 400, often up to about 200 and preferably up to about 150 carbon atoms. Often, the olefinically unsaturated hydrocarbon comprises at least one polyolefin. The olefinically unsaturated hydrocarbon has $\overline{M}_n$ ranging from about 300 to about 10,000, often $\overline{M}_n$ ranging from about 300 to about 8,000 and more frequently from about 300 to about 5,000. In another embodiment, the olefinically unsaturated hydrocarbon has $\overline{M}_n$ ranging from about 300, often from about 900 to about 2500. Preferred $\overline{M}_n$ values often depend upon the nature of the olefinically unsaturated hydrocarbon as set forth in greater detail hereinbelow.

Molecular weights of the olefinically unsaturated compounds are determined using well known methods described in the literature. Examples of procedures for determining the molecular weights are gel permeation chromatography (GPC) (also known as size-exclusion chromatography), light scattering, and vapor phase osmometry (VPO). The GPC technique employs standard materials against which the samples are compared. For best results, standards that are chemically similar to those of the sample are used. For example, for polystyrene polymers, a polystyrene standard, preferably of similar molecular weight, is employed. When standards are dissimilar to the sample, generally relative molecular weights of related polymers can be determined. For example, using a polystyrene standard, relative, but not absolute, molecular weights of a series of polymethacrylates may be determined. These and other procedures are described in numerous publications including:

P. J. Flory, "Principles of Polymer Chemistry", Cornell University Press (1953), Chapter VII, pp 266–316, and "Macromolecules, an Introduction to Polymer Science", F. A. Bovey and F. H. Winslow, Editors, Academic Press (1979), pp 296–312.

W. W. Yau, J. J. Kirkland and D. D. Bly, "Modern Size Exclusion Liquid Chromatography", John Wiley and Sons, New York, 1979.

In one preferred embodiment, the olefinically unsaturated hydrocarbon is a polyolefin, preferably a polyolefin derived from homopolymerized and interpolymerized $C_{2-28}$ olefins and mixtures thereof, optionally with at least one polyene.

In one preferred embodiment, the olefinically unsaturated hydrocarbon is a homopolymer derived from olefins containing from 2 to 4 carbon atoms. Preferably, the polymeric chains have terminal vinylidene groups.

In one embodiment, the polyolefin is an ethylene-alpha-olefin copolymer, preferably an ethylene-propylene copolymer having $\overline{M}_n$ ranging from about 300 to about 10,000, often to about 5,000 and the ethylene content ranges from about 25% to about 75% by weight.

In another preferred embodiment, the polyolefin is a polybutene having $\overline{M}_n$ ranging from about 300 to about 5,000, often from about 600 to about 2,500. Preferably, the polybutene is a polyisobutylene wherein at least about 30 mole %, preferably at least about 50 mole % of the polymeric chains have terminal vinylidene groups, and often at least about 70% of the polymeric chains have terminal vinylidene groups. Such materials and methods for preparing them are described in U.S. Pat. Nos. 5,286,823 and 5,408,018, which are expressly incorporated herein by reference. They are commercially available, for example under the tradenames ULTRAVIS® (BP Chemicals) and GLISSOPAL® (BASF).

A preferred source of polybutenes is that obtained by polymerization of a $C_4$ refinery stream having a butene content of 35 to 75 weight percent and isobutylene content of 15 to 60 weight percent in the presence of a Lewis acid catalyst such as aluminum trichloride or boron trifluoride. These polybutenes contain predominantly (greater than 80% of total repeating units) isobutylene repeating units of the configuration

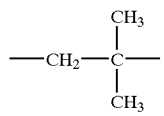

These polybutenes are typically monoolefinic, that is they contain but one olefinic bond per molecule.

In one embodiment, the monoolefinic groups are predominantly vinylidene groups, e.g., groups of the formula

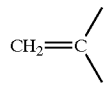

especially those of the formula

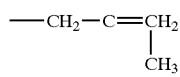

although the polybutenes may also comprise other olefinic configurations provided that the polybutene contains at least one allylic H atom.

In another embodiment, the polyolefin is a polypropylene.

In a further embodiment, the polyolefin is a terpolymer derived from ethylene, at least one $C_{3-28}$ olefin and a polyene. Preferably, the polyene is non-conjugated. In a particularly preferred embodiment, the terpolymer is derived from ethylene, propylene and at least one diene, preferably a non-conjugated diene. Preferably, the terpolymer has $\overline{M}_n$ ranging from about 1,000 to about 10,000, more often from about 2500 to about 9,000, and frequently from about 5,000 to about 8,000.

In an especially preferred embodiment, the ethylene content of the terpolymer ranges from about 25% to about 85% by weight and the non-conjugated polyene content ranges from about 0.5% to about 15% by weight. Frequently, the diene comprises at least one cyclic diene, often at least one of dicyclopentadiene and an alkylidene norbornene.

The terpolymers are prepared by methods well known to those of skill in the art and are commercially available, for example those marketed by Uniroyal Chemical Co., Inc., Middlebury, Conn., USA, under the tradename TRILENE®. Specific examples include Trilene 67 and 68, terpolymers of ethylene, propylene and ethylidene norbornene (ENB), and Trilene 55 and 65, terpolymers of ethylene, propylene and dicyclopentadiene. Some typical characteristics of Trilene 67 and 68 are iodine number 19 and 6, ethylene/propylene/ (ENB) (wt) 46/54/9.5 and 45/55/3, viscosity average molecular weight 7500 and 8000, and average C=C per molecule 5.6 and 1.9, respectively.

α,β-Unsaturated Carboxylic Compound

The α,β-unsaturated carboxylic compound used in the preparation of the hydrocarbyl substituted carboxylic compositions of this invention are themselves prepared by reacting (1) an active methylene compound and (2) a carbonyl compound. They are carboxylic compounds of the general formulae

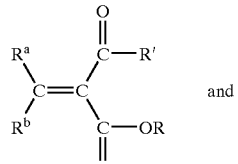

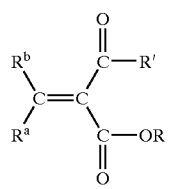

wherein each of $R^a$, $R^b$, R' and R is defined hereinabove and in greater detail hereinbelow.

Preferably the α,β-unsaturated carboxylic compound is a polycarboxylic compound, i.e., at least R' is OR or $R^b$ is C(O)OR.

In one preferred embodiment, the α,β-unsaturated carboxylic compound has the general formula (I), R' is lower alkyl and $R^a$ is H and $R^b$ is —C(O)R' wherein R' is OR and R is lower alyl.

In another preferred embodiment, the carboxylic compound has the general formula (II), $R^b$ is —C(O)OR wherein R is lower alkyl; $R^a$ is H; and R' is R or OR wherein R is H or lower alkyl.

They are often polycarboxylic compounds of the general formula

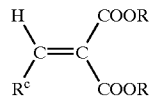

wherein $R^c$ is R;

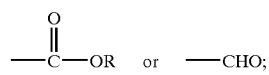

and each R is, independently, H or hydrocarbyl.

With the reaction of dimethyl malonate and the methyl hemiacetal of methyl glyoxylate, a minor amount (ca. 5% yield) of a product having the formula

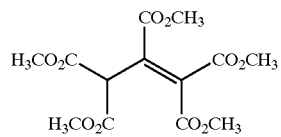

has been obtained.

Several compounds of this type are described in Hall et al, Polymer Bulletin 16, 405–9 (1986); Evans et al, J. Org. Chem. 54 2849 (1989); Hall et al, Macromolecules 8 22, (1975); Stetter et al, Synthesis 626 (1981); Wilk, Tetrahedron 53, 7097 (1997); Hawkins et al, U.S. Pat. No. 4,049, 698 and Roblin et al U.S. Pat. No. 2,293,309.

The α,β-unsaturated carboxylic compound is prepared by reacting (1) an active methylene compound and (2) a carbonyl compound. The Knoevenagel reaction wherein α,β-unsaturated compounds can be prepared by reaction of active methylene compounds with aldehydes is illustrative. Such reactions take place with or without solvent and with or without catalyst. Generally, the reaction takes place at temperatures between about 120° C. and 170° for 4 to 8 hours with liberated water being removed during reaction. The reaction products are often fractionally distilled to obtained the desired α,β-unsaturated compound.

Active Methylene Compound

Active methylene compounds (1) used to prepare (B) the α,β-unsaturated carboxylic compound have the general formula

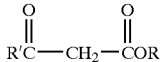

wherein each R' is independently R or OR and each R is, independently, H or a hydrocarbyl group. Useful active methylene compounds include malonic acid and esters thereof, especially di-lower alkyl malonate esters, and acetoacetic acid esters, particularly, lower alkyl, such as methyl, ethyl and propyl acetoacetates.

Especially preferred di-lower alkyl malonate esters are dimethyl malonate, diethyl malonate and methyl ethyl malonate. Especially preferred lower alkyl acetoacetates include methyl- or ethyl-acetoacetate.

Carbonyl Compound

Carbonyl compounds used to prepare (B) the α,β-unsaturated carboxylic compound have the general formula

wherein $R^a$ is H or hydrocarbyl, especially H or lower alkyl, and $R^b$ is a member of the group consisting of H, hydrocarbyl and

wherein each R' is independently R or OR and each R is, independently, H or a hydrocarbyl group; and lower alkyl acetals, ketals, hemiacetals and hemiketals of the carbonyl compound.

In one embodiment, the carbonyl compound comprises an aldehyde wherein $R^a$ is H and $R^b$ is H or lower alkyl. In another embodiment, the carbonyl compound comprises a ketone wherein each of $R^a$ and $R^b$ is a lower alkyl group. Formaldehyde is a useful aldehyde. Useful ketones include acetone and methyl ethyl ketone In a preferred embodiment the carbonyl compound is a compound having the general formula

wherein each R' is independently R or OR and each R is, independently, H or a hydrocarbyl group; or a lower alkyl hemiacetal thereof. Preferably, R' is a group of the formula OR wherein R is independently H or lower alkyl.

Preferred carbonyl compounds are glyoxylic acids and reactive equivalents thereof. In one preferred embodiment, the carbonyl compound is glyoxylic acid or the hydrate thereof. Particularly preferred are lower alkyl esters of glyoxylic acid. Especially preferred is a lower alkyl hemiacetals of a lower alkyl glyoxylate, most preferably, the methyl hemiacetal of methyl glyoxylate.

Process for Preparing Hydrocarbyl Group Substituted Carboxylic Composition

This invention is also directed to a process for preparing a hydrocarbyl group substituted carboxylic composition comprising reacting (A) an olefinically unsaturated hydrocarbon having at least one allylic hydrogen atom, and (B) an α,β-unsaturated carboxylic compound prepared by reacting (1) an active methylene compound of the formula

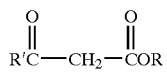

and (2) a carbonyl compound of the general formula

wherein $R^a$ is H or hydrocarbyl and $R^b$ is a member of the group consisting of H, hydrocarbyl and

wherein each R' is independently R or OR and each R is, independently, H or a hydrocarbyl group; and lower alkyl acetals, ketals, hemiacetals and hemiketals of the carbonyl compound (2). Preferred reactants for use in the process are the same as those described hereinabove.

Reactants (A) and (B) are generally reacted in amounts ranging from about 0.95 to about 4 moles (B) per equivalent of (A), wherein an equivalent of (A) is defined as the molecular weight of (A) divided by the number of olefinic groups therein. For example, the equivalent weight of a EPDM co-polymer having molecular weight of 10,000 and containing 4 olefinic groups is 2,500. In one preferred embodiment, about 3 moles (B) are reacted per equivalent of (A), while in another preferred embodiment, about 1 mole (B) is reacted with one equivalent of (A).

The process may be conducted at ambient pressure, under superatmospheric pressure or under reduced pressure. Usually, except when volatile by-products are being removed from the reaction mixture under reduced pressure, there is no advantage to conduct the reaction under other than ambient pressure.

The process is usually conducted thermally at temperatures ranging from ambient, usually from at least about 20° C. up to about 250° C., more often from about 80° C. to about 220° C.

In one embodiment, the process is conducted wherein said reacting of (A) the olefinically unsaturated hydrocarbon having at least one allylic hydrogen atom and (B) the α,β-unsaturated carboxylic compound is conducted with the addition of from about 0.1 to about 2.5 moles $Cl_2$ per mole of (B) polycarboxylic compound. In another embodiment, the reacting is conducted with the addition of from about 0.1 to about 2.2 moles $Cl_2$ per equivalent of olefinically unsaturated hydrocarbon. The process with added chlorine is also generally conducted at an elevated temperature, typically from about 130° C. up to about 200° C.

The following examples illustrate several α,β-unsaturated carboxylic compounds used in the preparation of the hydrocarbyl substituted carboxylic compositions of this invention. In these and in examples that follow, unless indicated otherwise, all parts are parts by weight, temperatures are in degrees Celsius, and pressures are atmospheric. The relationship between parts by weight and parts by volume is as grams to milliliters. Filtrations are conducted employing a diatomaceous earth filter aid.

EXAMPLE (B)-1

A reactor is charged with 30 parts dimethyl malonate and 27.2 parts glyoxylic acid methyl ester methyl hemiacetal (hereinafter GMHA). While these are being mixed, 23.17 parts acetic anhydride are added from an addition funnel at ambient temperature. Heating is begun and after 0.7 hour the temperature is 105° C. Heating is continued while distillate is collected in a Dean-Stark trap. Heating is continued for 4.7 hours while the temperature is increased to 130° C. At this point 8 parts by volume distillate has been collected in the Dean-Stark trap. The temperature is increased to 160° C. and is maintained for 7.5 hours while collecting 8.2 parts by volume additional distillate. Heating at 160° C. is continued for 7 hours followed by heating to 200° C. and vacuum distillation at 10 mm Hg pressure. Two fractions are obtained. Yield of desired product is 11.84 parts (25.8%).

EXAMPLE (B)-2

A reactor is charged with 30 parts dimethyl malonate and 27.2 parts GMHA. The materials are heated, under $N_2$ to 140° C. over 1 hour then temperature is maintained for 1.5 hours while collecting 6 parts by volume distillate in Dean-Stark trap The temperature is increased to 160° C. and is maintained for 13 hours. The temperature is increased to 170° C. and the materials are vacuum stripped at 5.2 mm Hg pressure. Solids and clear colorless liquid distill over and 6.48 parts white solid is isolated from the liquid by filtration through filter paper. The solid is the product at 14.13% yield.

EXAMPLE (B)-3

A reactor is charged with 253.73 parts dimethyl malonate and 230.65 parts GMHA. The materials me heated, under $N_2$ to 117° C. then to 125° C. over 5 hours while collecting 50 parts by volume distillate in a Dean-Stark trap. The temperature is increased to 130° C. then to 170° C. over 6.5 hours while collecting an additional 36.2 parts distillate. The temperature is increased to a maximum of 188° C. at 4.5 mm Hg pressure while collecting 199.65 parts distillate (51% yield). The distillate is the product.

EXAMPLE (B)-4

A reactor is charged with 132.12 parts dimethyl malonate and 120.1 parts GMHA. To the stirring mixture are added 1.79 parts dibutylamine. The materials are heated under $N_2$, to 130° C. over 8.25 hours while collecting a total of 36.5 parts by weight distillate in a Dean-Stark trap. The materials are cooled to 110° C. and vacuum distilled. The fraction collected at 6–10 mm Hg pressure and head temperature 134–152° C. (93.9 parts, 46.4% yield) is the product.

EXAMPLE (B)-5

A reactor is charged with 132.12 parts dimethyl malonate and 120.1 parts GMHA. The materials are heated, under $N_2$, over 7 hours while collecting a total of 273 parts by volume (235 parts by weight) distillate in a Dean-Stark trap. The temperature is increased to 170° C. and the materials are vacuum distilled. The fraction collected at 156–171° C. pot temperature (21–5 mm Hg pressure, 139–170° C. head temperature) (398.95 parts, 39.5% yield) is the product.

EXAMPLE (B)-6

A reactor is charged with 264.24 parts dimethyl malonate, 240.2 parts GMHA and 5.49 parts 70% aqueous methane sulfonic acid. The materials are heated to 140° C. over 6.25 hours while collecting a total of 63.8 parts distillate in a Dean-Stark trap. The temperature is increased to 160° C. and is maintained for 2.5 hours while collecting an additional 29 parts by volume distillate. The materials are vacuum distilled collecting 230.68 parts, (57.07% yield) at pot temperature 154–162° C., head temperature 130–140° C. and 5.630 mm Hg pressure as the product.

EXAMPLE (B)-7

A reactor is charged with 132.12 parts dimethyl malonate, 120.01 parts GMHA and 0.89 parts β-alanine. The materials are heated, under $N_2$, to 130° C. while collecting a total of 13.58 parts distillate in a Dean-Stark trap. The temperature is increased to 160° C. over 4.5 hours and is maintained for 2 hours while collecting an additional 11.65 parts distillate. The materials are vacuum distilled collecting 93.73 parts (46.37% yield) at pot temperature of 134–178° C., head temperature 108–120° C. at 4.4–7.5 mm Hg pressure as the product.

EXAMPLE (B)-8

A reactor is charged with 132.12 parts dimethyl malonate, 120.01 parts GMHA and 1.77 parts 30% aqueous $NH_4OH$. The materials are heated, under $N_2$, to 151° C. over 3 hours while collecting a total of 30.5 parts distillate in a Dean-Stark trap. The materials are vacuum distilled collecting 54.07 parts (26.74% yield) at pot temperature 145–157° C., head temperature 100–134° C. at 6–7.8 mm Hg pressure as the product.

EXAMPLE (B)-9

A reactor is charged with 532.3 parts GMHA, 585.6 parts dimethyl malonate and 6.08 parts 70% aqueous methanesulfonic acid. The materials are heated, under $N_2$, to 130° C. over 5.5 hours while collecting 43.79 parts distillate in a Dean-Stark trap. The temperature is increased to 140° C. and is maintained for 1 hour while collecting an additional 91.82 parts distillate. The temperature is increased to 150° C. over 1 hour and is maintained for 5.5 hours while collecting an additional 84.3 parts distillate. To the residue are added 4.62 parts $Na_2CO_3$, the materials are filtered then vacuum distilled to 150° C. and 10 mm Hg pressure. The fraction distilling at 100–130° C. (246.01 parts, 27.5% yield) is collected as the product.

EXAMPLE (B)-10

A reactor is charged with 720.6 parts GMHA and 660 parts dimethyl malonate. The materials are heated, under $N_2$, to 120° C. over 6 hours, collecting 81.22 parts distillate in a Dean-Stark trap. The temperature is increased to 150° C. over 6 hours, collecting an additional 121.93 parts distillate. The temperature is maintained for 6 hours, collecting an additional 47.52 parts distillate. The materials are vacuum distilled collecting 401.69 parts (39.7% yield) at 150–160°

C. pot temperature, 100–127° C. head temperature at 5 mm Hg pressure as the product.

EXAMPLE (B)-11

A reactor is charged with 160.17 parts dimethyl malonate and 120.1 parts GMHA. The materials are heated under $N_2$ to 150° C. over 8 hours, collecting a total of 43 parts by volume distillate in a Dean-Stark trap. The temperature is maintained for 4 hours, collecting an additional 37.8 parts distillate. The materials are vacuum distilled. The fraction distilling 100–120° C. head temperature at 3.3 mm Hg pressure (121.87 parts, 52.9% yield) is collected as product.

EXAMPLE (B)-12

A reactor is charged with 30 parts dimethyl malonate, 27.2 parts GMHA and 0.62 parts 70% aqueous methanesulfonic acid. The materials are heated to 160° C. over 5 hours then the temperature is maintained for 3 hours. The materials are vacuum stripped to 130° C. and 4.9 mm Hg. The solid-liquid mixture is obtained. The mixture is filtered through paper and 12.85 parts white solids (28% yield) is collected as the product.

EXAMPLE (B)-13

A reactor is charged with 240.2 parts GMHA, 264.24 parts dimethyl malonate and 25 parts of sulfonated poly (styrene-co-divinylbenzene) resin (AMBERLYST®35, Rohm and Haas)). The materials are heated, under $N_2$, to 120° C. over 7 hours, then maintained at temperature for 13.5 hours. The materials are filtered to remove Amnberlyst 35, and the liquid filtrate is vacuum distilled. The fraction distilling at 150° C. pot temperature, 95–125° C. head temperature at 8.3 min Hg pressure (138.1 parts, 34.1% yield), is collected as the product.

EXAMPLE (B)-14

A reactor is charged with 65.07 parts ethyl acetoacetate, 61.02 parts GMHA, 5.0 parts 3-aminopropyl-functionalized silica gel and 100 parts by volume toluene. The materials are heated, under $N_2$, to 70° C. over 0.5 hour, then temperature is maintained for hours. The temperature is increased to 80° C. over 3.25 hour then to 90° C. over 2 hours. The temperature is maintained at 90° C. for 7 hours. The materials are vacuum distilled. The fraction distilling at 130° C. pot temperature, 115° C. head temperature at 5.4 mm Hg pressure (55.3 parts, 54.7% yield, is collected as the product. The product is 93.3% triethyl ethylenetricarboxylate as determined by gas chromatography/MS.

EXAMPLE (B)-15

A reactor is charged with 300 parts dimethyl malonate and 272.7 parts GMRA. The materials are heated, under $N_2$, to 123° C. at which time a strong reflux is observed. The materials are heated to 170° C. over 6.5 hours while 107.1 parts distillate are collected. The residue, 400.9 parts, 87.3% yield is the product

EXAMPLE (B)-16

The crude liquid product (225 parts) of Example (B)-15 is vacuum distilled at maximum pot temperature of 200° C. and 4 mm Hg pressure. The distillate, a white solid in a clear liquid (total 148.87 parts) is collected and is the product.

EXAMPLE (B)-17

A reactor is charged with 1322.2 parts dimethyl malonate and 1201.8 parts GMHA. The materials are heated, under $N_2$ to 150° C. over 5 hours then temperature is maintained for 5 hours. The temperature is increased to 145° C., is maintained for 1 hour, then is increased to 150° C. and is maintained at temperature for 4 hours. A total of 427.38 parts distillate is collected. The materials are vacuum distilled, collecting the fraction distilling at 130–150° C./5 mm Hg pressure (477.3 parts, 23.6% yield).

EXAMPLE (B)-18

A reactor is charged with 260.28 parts ethyl acetoacetate, 240.2 parts GMHA, 20 parts 3-aminopropyl-functionalized silica gel and 400 parts by volume toluene. The materials are heated, under $N_2$, to 90° C. over 1 hour then temperature is maintained at 90° C. for 7.5 hours while removing distillate. The materials are filtered through filter paper which is subsequently washed with 100 parts by volume toluene. The filtrate and washings are vacuum stripped to 110° C. pot temperature (80° C. head temperature) at 3 mm Hg pressure, yielding 367.51 parts (91.78% yield) as the major product.

EXAMPLE (B)-19

A portion of the product of Example (B)-8 (280 parts) is vacuum distilled to 135° C. and 4 mm Hg pressure yielding 233.07 parts distillate as product.

The following examples illustrate hydrocarbyl group substituted carboxylic compositions of this invention. Temperatures, pressures, and amounts are as set forth hereinabove.

EXAMPLE 1

A reactor is charged with 555.7 parts of Trilene 67, 555.1 parts mineral oil and 320.9 parts trimethyl ethylenetricarboxylate prepared according to the preceding examples. The materials are heated to 170° C., then over 3 hours, to 200° C. While maintaining temperature, the materials are heated for 24 hours. The materials are stripped for 5 hours at 160° C. at 2–3.7 mm Hg pressure, collecting 243.36 parts distillate. The residue shows 45.8% non-polar material.

EXAMPLE 2

A reactor is charged with 300 parts of polyisobutylene ($\overline{M}_n$~2300, 90% vinylidene, GLISSOPAL® 2300, BASF) and 94 parts of the product of Example (B)-11. The materials are heated, under $N_2$ to 170° C. then to 200° C. over 3 hours and held at temperature for 23 hours. The materials are vacuum stripped at 200° C. and 4 mm Hg for 2 hours. The residue has saponification number (ASTM D-94)=78.04.

EXAMPLE 3

A reactor is charged with 30 parts polyisobutylene (($\overline{M}_n$~1000, containing about 80 mole percent terminal vinylidene groups, ULTRAVIS® 10 BP Chemicals) and 6.06 parts of the product of Example (B)-1. The materials are heated, under $N_2$, to 160° C. over 4 hours, then held at temperature for 1.25 hour. The temperature is increased to 200° C. and is maintained for a total of 19 hours. The materials are vacuum stripped to 210° C. at 10 mm Hg for 1 hour. The residue has saponification number=119.3. $\overline{M}_n$=938 and $\overline{M}_w/\overline{M}_n$=1.94.

EXAMPLE 4

A reactor is charged with 60 parts dimethyl malonate and 54.4 parts GMHA. The materials are heated, under $N_2$, to 130° C. and are held at temperature for a total of 6 hours, while returning distillate to reactor. The temperature is increased to 140° C. and is maintained for 8 hours, collecting 13 parts by volume distillate. The temperature is increased to 160° C. and is maintained for 7 hours collecting a total of 9 parts distillate. To the materials in the reactor are added 60 parts Ultravis 10 followed by heating to 180° C. over 2 hours then to 200° C. over 1.5 hours. The materials are held at 200° C. for a total of 10 hours, then vacuum stripped at 200° C. and 10 mm Hg for 2 hours. The residue has saponification number=89.4, $\overline{M}_n$=997 and $\overline{M}_w/\overline{M}_n$=1.92.

EXAMPLE 5

A reactor is charged with 500 parts of polyisobutylene having $\overline{M}_n$~2000 and 101.11 parts of the product of Example (B)-15. The materials are heated, under $N_2$, at 200° C. for 24 hours then vacuum stripped for 2.5 hours at 200° C. and 4 mm Hg pressure. The materials are filtered using a diatomaceous earth filter aid. Filtered yield=529.52 parts, 96.18%. Filtrate has saponification no=37.23, $\overline{M}_n$=1880 and $\overline{M}_w/\overline{M}_n$=3.24.

EXAMPLE 6

A reactor is charged with 500 parts of Glissopal 2300 and 45.83 parts of the product of Example (B)-15. The materials are heated, under $N_2$, to 200° C. over 2.5 hour, then temperature is maintained for 13.5 hour. The materials are vacuum stripped at 200° C. and 10 mm Hg pressure for 2 hours, yielding 526.3 parts (96.43% yield) product.

EXAMPLE 7

A reactor is charged with 500 parts of Glissopal 2300 and 45.83 parts of the product of Example (B)-16 The materials are heated, under $N_2$, to 200° C. over 2 hours then the temperature is maintained for 14.5 hours. The materials are stripped for 1.5 hour at 200° C. and 10 mm Hg pressure, yielding 522.29 parts (95.7% yield) product.

EXAMPLE 8

A reactor is charged with 400 parts of Glissopal 2300 and 110 parts of the product of Example (B)-3. The materials are heated to 170° C. then from 170° C. to 200° C. over 3 hours. The materials are held at 200° C. for 24 hours then stripped at 200° C. and 4 mm Hg pressure for 2 hours. Residue has saponification number of 89.16, $\overline{M}_n$=2078 and $\overline{M}_w/\overline{M}_n$=2.28.

EXAMPLE 9

The procedure of Example 8 is followed replacing Glissopal 2300 with 400 parts of a polyisobutylene having $\overline{M}_n$~2000 and using 121.33 parts of the product of Example (B)-3. The product has saponification number=53.57, $\overline{M}_n$=1796 and $\overline{M}_w/\overline{M}_n$=3.34.

EXAMPLE 10

The procedure of Example 8 is followed employing 1000 parts Glissopal 2300 and 275 parts of the product of Example (B)-5. Stripping is at 210° C. and 2.3 mm Hg pressure for 3 hours. The residue has saponification number=78.55, $\overline{M}_n$=2176 and $\overline{M}_w/\overline{M}_n$=2.18.

EXAMPLE 11

A reactor is charged with 400 parts of Glissopal 2300 and 109.9 parts of the product of Example (B)-6. The materials are heated, under $N_2$ over 2 hours to 240° C. then are held at temperature for 6 hours. The materials are vacuum stripped at 220° C. and 4.6 mm Hg for 2 hours. The product has saponification number=66.9.

EXAMPLE 12

A reactor is charged with 250 parts Glissopal 2300 and 45.33 parts of the product of Example (B)-14. The materials are heated, under $N_2$, to 200° C. over 3.6 hour. The temperature is maintained for 3 hours. The materials are vacuum stripped to 200° C. at 3.7 mm Hg pressure, collecting 13.4 parts clear pale yellow distillate. The product (272.67 parts, ~100% yield), has saponification no.=48.8, $\overline{M}_n$=1922 and $\overline{M}_w/\overline{M}_n$=2.42.

EXAMPLE 13

A reactor is charged with 1700 parts Glissopal 2300 and 467.5 parts of the product of Example (B)-17. The materials are heated, under $N_2$, to 200° C. over 3 hours and are maintained at 200° C. for 24 hours, then vacuum stripped at 200° C. at 2 mm Hg pressure for 1.5 hours. The residue has saponification no=85.85.

EXAMPLE 14

A reactor is charged with 164.14 parts Glissopal 2300 and 150.46 parts of the distillate obtained from stripping the reaction mixture of Example 10. The materials are heated, under $N_2$, to 200° C. then maintained at 200° C. for 24 hours. The materials are allowed to cool to room temperature, then are heated to 150° C. When stirring is stopped, 2 layers form. The bottom layer is removed and the top layer is stipped to 200° C. at 8 mm Hg pressure for 2 hours. The residue has saponification number 75.26 and contains 675% non polar materials.

EXAMPLE 15

A reactor is charged with 100 parts of polyisobutylene ($\overline{M}_n$=950) and 20 parts of the product of Example (B)-19. The materials are heated, under $N_2$ to 160° C., temperature is maintained for 3.5 hours then is increased to 170° C. and is maintained for 22 hours. The temperature is increased to 200° C. and is maintained for 8 hours followed by vacuum stripping to 200° C. and 5 mm Hg pressure. The residue is filtered with diatomaceous earth filter aid. Filtrate contains 40% nonpolar material by thin layer chromatography using flame ion detector (TLC-FID). Saponification number= 63.10.

EXAMPLE 16

A reactor is charged with 100 parts of the polyisobutylene used in Example 15 and 80 parts of the product of Example (B)-19. The materials are heated, under $N_2$, to 150° C. then the temperature is maintained for 24 hours. When stirring is stopped, an amber colored liquid separates and settles to the bottom of the flask. The liquid (42.3 parts) is removed. The remaining materials are heated to 150° C. then stripped to 190° C. while collecting 28.7 parts distillate. The residue has saponification no=46.97 and shows 57% non polar materials by TLC-FID.

EXAMPLE 17

A reactor is charged with 250 parts of polyisobutylene having $\overline{M}_n$~2000 and 75 parts of the product of Example (B)-18. The materials are heated over 3 hours, under $N_2$, to 170° C. then to 200° C. The materials are maintained at temperature for 4 hours then are stripped to 200° C. and 3 mm Hg pressure for 2 hours. The residue separates into 2 phases.

The hydrocarbyl group substituted carboxylic compositions of this invention are useful as additives for lubricating oil compositions and may be incorporated in a minor amount into a major amount of an oil of lubricating viscosity. They also serve as intermediates to undergo further reaction with amines, alcohols and metal-containing compounds to prepare derivative compositions which are useful as additives for lubricants and fuels. The carboxylic derivative compositions are also incorporated in a minor amount into a major amount of an oil of lubricating viscosity. A major amount is defined herein as any amount greater than 50% by weight and a minor amount is any amount less than 50% by weight provided the total of all components is 100%.

Hydrocarbyl Group Substituted Carboxylic Derivative Compositions

The instant invention is also directed to derivatives of the hydrocarbyl substituted carboxylic compositions. These derivatives are hydrocarbyl group substituted carboxylic derivative compositions prepared by reacting at least one hydrocarbyl group substituted carboxylic composition of this invention with a reactant selected from the group consisting of (a) amines characterized by the presence within their structure of at least one condensable H—N<group, (b) alcohols, (c) reactive metal or reactive metal compounds, and (d) a combination of two or more of any of (a) through (c), the components of (d) being reacted with the carboxylic composition simultaneously or sequentially, in any order.

The hydrocarbyl group substituted carboxylic compositions are described in detail hereinabove.

Amines

The amines may be monoamines or polyamines, typically polyamines, preferably ethylene amines, amine bottoms or amine condensates. The amines can be aliphatic, cycloaliphatic, aromatic, or heterocyclic, including aliphatic-substituted cycloaliphatic, aliphatic-substituted aromatic, aliphatic-substituted heterocyclic, cycloaliphatic-substituted aliphatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted alicyclic, and beterocyclic-substituted aromatic amines and may be saturated or unsaturated.

Monoamines useful in this invention generally contain from 1 to about 24 carbon atoms, preferably 1 to about 12, and more preferably 1 to about 6. Examples of primary monoamines useful in the present invention include methylamine, propylamine, butylamine, cyclopentylamine, dodecylamine, allylamine, cocoamine and stearylamine. Examples of secondary monoamines include dimethylamine, dipropylamine, dicyclopentylamine, methylbutylamine, etc.

The monoamine may be an alkanol amine represented by at least one of the formulae:

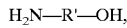

and

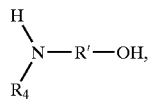

wherein each $R_4$ is independently a hydrocarbyl group of one to about 22 carbon atoms or hydroxyhydrocarbyl group of two to about 22 carbon atoms, preferably one to about four, and R' is a divalent hydrocarbyl group of about two to about 18 carbon atoms, preferably two to about four. The group —R'—OH in such formulae represents the hydroxyhydrocarbyl group. R' can be an acyclic, alicyclic or aromatic group. Typically, R' is an acyclic straight or branched alkylene group such as an ethylene, 1,2-propylene, 1,2-butylene, 1,2-octadecylene, etc. group. When two $R^4$ groups are present in the same molecule they can be joined by a direct carbon-to carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each $R^4$ is independently a methyl, ethyl, propyl, butyl, pentyl or hexyl group.

Examples of alkanolamines include mono- and di-ethanolamine, ethylethanolamine, monomethylethanolamine, etc.

The hydroxyamines can also be ether N-(hydroxyhydrocarbyl) amines. These are hydroxy poly (hydrocarbyloxy) analogs of the above-described hydroxy amines (these analogs also include hydroxyl-substituted oxyalkylene analogs). Such N-(hydroxyhydrocarbyl) amines can be conveniently prepared, for example, by reaction of epoxides with aforedescribed amines and can be represented by the formulae:

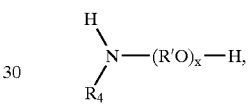

wherein x is a number from about 2 to about 15 and $R_4$ and R' are as described above $R_4$ may also be a hydrokypoly hydrocarbyloxy) group.

Other useful amines include ether amines of the general formula

wherein $R_6$ is a hydrocarbyl group, preferably an aliphatic group, more preferably an alkyl group, containing from 1 to about 24 carbon atoms, $R^1$ is a divalent hydrocarbyl group, preferably an alkylene group, containing from two to about 18 carbon atoms, more preferably two to about 4 carbon atoms and $R_7$ is H or hydrocarbyl, preferably H or aliphatic, more preferably H or alkyl, more preferably H. When $R_7$ is not H, then it preferably is alkyl containing from one to about 24 carbon atoms. Especially preferred ether amines are those available under the name SURFAM® produced and marketed by Sea Land Chemical Co., Westlake, Ohio.

The amine may also be a polyamine. The polyamine may be aliphatic, cycloaliphatic, heterocyclic or aromatic. Examples of useful polyamines include alkylene polyamines, hydroxy containing polyamines, polyoxyalkylene polyamines, arylpolyamines, and heterocyclic polyamines.

Alkylene polyamines are represented by the formula

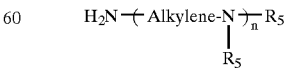

wherein n has an average value between about 1 and about 10, preferably about 2 to about 7, more preferably about 2 to about 5, and the "Alkylene" group has from 1 to about 10 carbon atoms, preferably about 2 to about 6, more preferably about 2 to about 4. $R_5$ is independently hydrogen, an aliphatic group or a hydroxy-substituted or amino-substituted aliphatic group of up to about 30 carbon atoms. Preferably $R_5$ is H or lower alkyl, most preferably, H.

Alkylene polyamines include methylene-, ethylene-, butylene-, propylene-, pentylene- and other polyamines. Higher homologs and related heterocyclic amines such as piperazines and N-amino alkyl-substituted piperazines are also included. Specific examples of such polyamines are ethylene diamine, diethylene triamine, triethylene tetramine, tris-(2-aminoethyl)amine, propylene diamine, N,N-dimethylaminopropylamine, trimethylene diamine, tripropylene tetramine, tetraethylene pentamine, hexaethylene heptamine, pentaethylenehexamine, aminoethyl piperazine, etc.

Higher homologs obtained by condensing two or more of the above-noted alkylene amines are similarly useful as are mixtures of two or more of the aforedescribed polyamines.

Ethylene polyamines, such as some of those mentioned above, are preferred. They are described in detail under the heading "Dianmines and Higher Amines" in Kirk Othmer's "Encyclopedia of Chemical Technology", 4th Edition, Vol. 8, pages 74–108, John Wiley and Sons, New York (1993) and in Meinhardt, et al, U.S. Pat. No. 4,234,435, both of which are hereby incorporated herein by reference for disclosure of useful polyamines. Such polyamines are most conveniently prepared by the reaction of ethylene dichloride with ammonia or by reaction of an ethylene imine with a ring opening reagent such as water, ammonia, etc. These reactions result in the production of a complex mixture of polyalkylene polyamines including cyclic condensation products such as the aforedescribed piperazines. Ethylene polyamine mixtures are useful.

Other useful types of polyamine mixtures are those resulting from stripping of the above-described polyamine mixtures to leave as residue what is often termed "polyamine bottoms". In general, alkylene polyamine bottoms can be characterized as having less than two, usually less than 1% (by weight) material boiling below about 200° C. A typical sample of such ethylene polyamine bottoms obtained from the Dow Chemical Company of Freeport, Tex., designated "E-100" has a specific gravity at 15.6° C. of 1.0168, % nitrogen of 33.15 and a viscosity at 40° C. of 121 centistokes. Gas chromatography analysis shows such a sample contains about 0.93% "Light Ends" (most probably diethylenetriamine), 0.72% triethylenetetramine, 21.74% tetraethylenepentamine and 76.61% pentaethylene hexamine and higher (by weight). These alkylene polyamine bottoms include cyclic condensation products such as piperazine and higher analogs of diethylenetriamine, triethylenetetramine and the like.

Another useful polyamine is a condensation product obtained by reaction of at least one hydroxy compound with at least one polyamine reactant containing at least one primary or secondary amino group. The hydroxy compounds are preferably polyhydric alcohols and amines. Preferably the hydroxy compounds are polyhydric amines. Polyhydric amines include any of the above-described monoamines reacted with an alkylene oxide (e.g., ethylene oxide, propylene oxide, butylene oxide, etc.) having two to about 20 carbon atoms, preferably two to about four. Examples of polyhydric amines include tri-(hydroxypropyl) amine, tris-(hydroxymethyl)amino methane, 2-amino-2-methyl-1,3-propanediol, N,N,N',N'-tetrakis(2-hydroxypropyl) ethylenediamine, and N,N,N',N'-tetrakis(2-hydroxyethyl) ethylenediamine.

Polyamine reactants, which react with the polyhydric alcohol or amine to form the condensation products or condensed amines, are described above. Preferred polyamine reactants include triethylenetetramine (TETA), tetraethylenepentamine (TEPA), pentaethylenehexamine (PEHA), and mixtures of polyamines such as the above-described "amine bottoms".

The condensation reaction of the polyamine reactant with the hydroxy compound is conducted at an elevated temperature, usually about 60° C. to about 265° C. in the presence of an acid catalyst.

The amine condensates and methods of making the same are described in Steckel (U.S. Pat. No. 5,053,152) which is incorporated by reference for its disclosure to the condensates and methods of making amine condensates.

The polyamines may be hydroxy-containing polyamines. These include hydroxy-containing polyamine analogs of hydroxy monoamines, particularly alkoxylated alkylenepolyamines. Such polyamines can be made by reacting the above-described alkylene amines with one or more of the above-described alkylene oxides.

Specific examples of alkoxylated alkylenepolyamines include N-(2-hydroxyethyl)ethylenediamine, N,N-di-(2-hydroxyethyl)ethylenediamine, 1-(2-hydroxyethyl) piperazine, mono-(hydroxypropyl)-substituted tetraethylenepentamine, N-(3-hydroxybutyl)-tetramethylene diamine, etc. Higher homologs obtained by condensation of the above illustrated hydroxy-containing polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid polyamines are also useful.

The polyamines may be polyoxyalkylene polyamines, including polyoxyethylene and polyoxypropylene diamines and the polyoxypropylene triamines having average molecular weights ranging from about 200 to about 2000. Polyoxyalkylene polyamines, including polyoxyethylene-polyoxypropylene polyamines, are commercially available, for example under the tradename JEFFAMINES® from Texaco Chemical Co. U.S. Pat. Nos. 3,804,763 and 3,948,800 contain disclosures of polyoxyalkylene polyamines and are incorporated herein by reference for their disclosure of such materials.

In another embodiment, the polyamine may be a heterocyclic polyamine. The heterocyclic polyamines include aziridines, azetidines, azolidines, tetra- and dihydropyridines, pyrroles, indoles, piperidines, imidazoles, di- and tetrahydroimidazoles, piperazines, isoindoles, purines, N-aminoalkyl-thiomorpholines, N-aminoalkylmorpholines, N-aminoalkyl-piperazines, N,N'-bisaminoalkyl piperazines, azepines, azocines, azonines, azecines and tetra-, di- and perhydro derivatives of each of the above and mixtures of two or more of these heterocyclic amines. Preferred heterocyclic amines are the saturated 5- and 6-membered heterocyclic amines containing only nitrogen, or nitrogen with oxygen and/or sulfur in the hetero ring, especially the piperidines, piperazines, thiomorpholines, morpholines, pyrrolidines, and the like. Piperidine, aminoalkylsubstituted piperidines, piperazine, aminoalkylsubstituted piperazines, morpholine, aminoalkyl-substituted morpholines, pyrrolidine, and aminoalkylsubstituted pyrrolidines, are especially preferred. Usually the aminoa substituents are substituted on a nitrogen atom forming part of the hetero ring. Specific examples of such heterocyclic amines include N-aminopropylmorpholine, N-amino-ethylpiperazine, and N,N'-diaminoethylpiperazine. Hydroxy alkyl substituted heterocyclic polyamines are also useful. Examples include N-hydroxyethylpiperazine and the like.

Hydrazine and substituted-hydrazine can also be used to form nitrogen-containing carboxylic dispersants. At least one of the nitrogens in the hydrazine must contain a hydrogen directly bonded thereto. Preferably there are at least two hydrogens bonded directly to hydrazine nitrogen and, more preferably, both hydrogens are on the same nitrogen. The substituents which may be present on the hydrazine include alkyl, alkenyl, aryl, aralkyl, alkaryl, and the like. Usually, the substituents are alkyl, especially lower alkyl, phenyl, and substituted phenyl such as lower alkoxy-substituted phenyl or lower alkyl-substituted phenyl. Specific examples of substituted hydrazines are methylhydrazine, N,N-dimethylhydrazine, N,N'-dimethylhydrazine, phenylhydrazine, N-phenyl-N'-ethylhydrazine, N-(para-tolyl)-N'-(n-butyl)-hydrazine, N-(para-nitrophenyl)hydrazine, N-(para-nitrophenyl)-N-methyl-hydrazine, N,N'-di(para-chlorophenol)-hydrazine, N-phenyl-N'-cyclohexylhydrazine, amino guanidine bicarbonate, and the like.

The carboxylic derivative compositions produced by reacting the hydrocarbyl group substituted carboxylic composition of the invention and the amines described above are acylated amines which include amine salts, amides, imides and imidazolines as well as mixtures thereof. To prepare the carboxylic derivative compositions from the amines, one or more of the hydrocarbyl group substituted carboxylic composition and one or more amines are heated, optionally in the presence of a normally liquid, substantially inert organic liquid solvent/diluent, at temperatures in the range of from about 80° C. up to the decomposition point of any of the reactants or the product, but normally at temperatures in the range of from about 100° C. up to about 300° C., provided 300° C. does not exceed the decomposition point. Temperatures of about 125° C. to about 250° C. are normally used. The carboxylic, composition and the amine are reacted in an amount sufficient to provide from about one-half equivalent up to two moles of amine per equivalent of the carboxylic composition. In another embodiment, the carboxylic composition is reacted with from about one-half equivalent up to one mole of amine per equivalent of the carboxylic composition. For the purpose of this invention, an equivalent of amine is that amount of amine corresponding to the total weight of amine divided by the total number of nitrogens present having at least one H—N<group. Thus, octyl amine has an equivalent weight equal to its molecular weight; ethylenediamine has an equivalent weight equal to one-half its molecular weight, and aminoethylpiperazine, with 3 nitrogen atoms but only two having at least one H—N<group, has an equivalent weight equal to one-half of its molecular weight.

Alcohols

The carboxylic compositions may be reacted with (b) alcohols. Alcohols useful as (b) in preparing carboxylic derivative compositions of this invention from the hydrocarbyl group substituted carboxylic composition previously described include those compounds of the general formula $R_3$—(OH)$_m$ 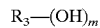

wherein $R_3$ is a monovalent or polyvalent organic radical joined to the —OH groups through carbon-to-oxygen bonds (that is, —C—OH 

wherein the carbon is not part of a carbonyl group) and m is an integer of from 1 to about 10, usually 2 to about 6. As with the amine reactant (a), the alcohols can be aliphatic, cycloaliphatic, aromatic, and heterocyclic, including aliphatic-substituted cycloaliphatic alcohols, aliphatic-substituted aromatic alcohols, aliphatic-substituted heterocyclic alcohols, cycloaliphatic-substituted aliphatic alcohols, cycloaliphatic-substituted aromatic alcohols, cycloaliphatic-substituted heterocyclic alcohols, heterocyclic-substituted aliphatic alcohols, heterocyclic-substituted cycloaliphatic alcohols, and heterocyclic-substituted aromatic alcohols. Except for polyoxyalkylene alcohols, the mono- and polyhydric alcohols corresponding to the above formula will usually contain not more than about 40 carbon atoms and generally not more than about 20 carbon atoms. The alcohols may contain non-hydrocarbon substituents of the same type mentioned with respect to the amines above, that is, non-hydrocarbon substituents which do not interfere with the reaction of the alcohols with the acylating reagents of this invention. In general, polyhydric alcohols are preferred.

The monohydric and polyhydric alcohols useful as (b) include monohydroxy and polyhydroxy aromatic compounds. Monohydric and polyhydric phenols and naphthols are preferred hydroxyaromatic compounds. These hydroxy-substituted aromatic compounds may contain other substituents in addition to the hydroxy substituents such as halo, alkyl, alkenyl, alkoxy, alkyl-mercapto, nitro and the like. Usually, the hydroxy aromatic compound will contain 1 to 4 hydroxy groups. The aromatic hydroxy compounds are illustrated by the following specific examples: phenol, beta-naphthol, cresols, resorcinol, catechol, carvacrol, thymol, eugenol, p,p'-dihydroxybiphenyl, hydroquinone, pyrogallol, phloroglucinol, orcin, guaicol, 2,4-dibutylphenol, propenetetramer-substituted phenol, didodecylphenol, 4,4'-methylene-bis-methylene-bis-phenol, alphadecyl-beta-naphthol, polyisobutenyl-(molecular weight of about 1000)-substituted phenol, the condensation product of heptylphenol with 0.5 mole of formaldehyde, the condensation product of octylphenol with acetone, di(hydroxyphenyl)oxide, di(hydroxyphenyl)sulfide, di(hydroxyphenyl)disulfide, and 4-cyclohexylphenol. Phenol itself and aliphatic hydrocarbon-substituted phenols, e.g., alkylated phenols having up to 3 aliphatic hydrocarbon substituents are especially preferred. Each of the aliphatic hydrocarbon substituents may contain 100 or more carbon atoms but usually will have from 1 to 20 carbon atoms. Alkyl and alkenyl groups are the preferred aliphatic hydrocarbon substituents.

Further specific examples of monohydric alcohols which can be used as (b) include monohydric alcohols such as methanol, ethanol, isooctanol, cyclohexanol, behenyl alcohol, neopentyl alcohol, isobutyl alcohol, benzyl alcohol, beta-phenethyl alcohol, 2,-methylcyclohexanol, monomethyl ether of ethylene glycol, monobutyl ether of ethylene glycol, monopropyl ether of diethylene glycol, monododecyl ether of triethylene glycol, monooleate of ethylene glycol, monostearate of diethylene glycol, sec-pentyl alcohol, tert-butyl alcohol, and dioleate of glycerol. Alcohols within (b) may be unsaturated alcohols such as allyl alcohol, cinnamyl alcohol, 1-cyclohexene-3-ol and oleyl alcohol.

Other specific examples of alcohols useful as (b) are the ether alcohols and amino alcohols including, for example, the oxyalkylene, oxy-arylene-, aminoalkylene-, and aminoarylene-substituted alcohols having one or more oxyalkylene, aminoalkylene or amino-aryleneoxy-arylene groups. They are exemplified by CELLOSOLVE®, CARBITOL®, phenoxyethanol, heptylphenyl- (oxypropylene)$_6$-OH, octyl-(oxyethylene)$_{30}$-OH phenyl-(oxyoctylene)$_2$-OH, mono-(heptylphenyl-oxypropylene) substituted glycerol, poly(styrene oxide), aminoethanol, 3-aminoethylpentanol, di(hydroxyethyl)amine, p-aminophenol, tri(hydroxypropyl)amine, N-hydroxyethyl ethylenediamine, N,N,N',N'-tetrahydroxy-trimethylenediamine, and the like. The polyhydric alcohols preferably contain from 2 to about 10 hydroxy groups. They are illustrated, for example, by the alkylene glycols and polyoxyalkylene glycols mentioned above such as ethylene glycol, triethylene glycol, tetraethylene glycol, dipropylene glycol, dibutylene glycol, and other alkylene glycols and polyoxyalkylene glycols in which the alkylene groups contain 2 to about 8 carbon atoms.

Other useful polyhydric alcohols include glycerol, monooleate of glycerol, monostearate of glycerol, monomethyl ether of glycerol, pentaerythritol, n-butyl ester of 9,10-dihydroxy stearic acid, methyl ester of 9,10-dihydroxy stearic acid, 1,2-butanediol, 2,3-hexanediol, 2,4-hexanediol, pinacol, erythritol, arabitol, sorbitol, mannitol, 1,2-cyclohexanediol, and xylene glycol. Carbohydrates such as sugars, starches, celluloses, and so forth likewise can be used as (b). The carbohydrates may be exemplified by glucose, fructose, sucrose, rhamnose, mannose, glyceraldehyde, and galactose.

Polyhydric alcohols having at least 3 hydroxyl groups, some, but not all of which have been esterified with an aliphatic monocarboxylic acid having from about 8 to about 30 carbon atoms such as octanoic acid, oleic acid, stearic acid, linoleic acid, dodecanoic acid or tall oil acid are useful as (b). Further specific examples of such partially esterified polyhydric alcohols are the monooleate of sorbitol, distearate of sorbitol, monooleate of glycerol, monostearate of glycerol, didodecanoate of erythritol, and the like.

A preferred class of alcohols suitable as (b) are those polyhydric alcohols containing up to about 12 carbon atoms, and especially those containing 3 to 10 carbon atoms. This class of alcohols includes glycerol, erythritol, pentaerythritol, dipentaerythritol, gluconic acid, glyceraldehyde, glucose, arabinose, heptanediols, hexanetriols, butanetriols, guinic acid, 2,2,6,6-tetrakis (hydroxymethyl)cyclohexanol, 1,10-decanediol, digitalose, and the like. Aliphatic alcohols containing at least three hydroxyl groups and up to 10 carbon atoms are particularly preferred.

An especially preferred class of polyhydric alcohols for use as (b) are the polybydric alkanols containing 3 to 10 carbon atoms and particularly, those containing 3 to 6 carbon atoms and having at least three hydroxyl groups. Such alcohols are exemplified by glycerol, erythritol, pentaerythritol, mannitol, sorbitol, 2-hydroxymethyl-2-methyl-1,3-propanediol(trimethylolethane), 2-hydroxymethyl-2-ethyl-1,3-propanediol(trimethylpropane), 1,2,4-hexanetriol, and the like.

From what has been stated above, it is seen that (a) may contain alcoholic hydroxy substituents and (b) can contain primary, secondary, or tertiary amino substituents. Thus, amino alcohols can fall into both (a) and (b) provided they contain at least one primary or secondary amino group. If only tertiary amino groups are present, the amino alcohol belong only in (b).

Reactive Metals

Reactive metals or reactive metal compounds useful as (c) are those which will form carboxylic acid metal salts with the hydrocarbyl group substituted carboxylic composition of this invention and those which will form metal-containing complexes with the carboxylic derivative compositions produced by reacting the hydrocarbyl group substituted carboxylic composition with amines and/or alcohols as discussed above.

Reactive metal compounds useful for preparing metal salts of hydrocarbyl group substituted carboxylic composition of this invention include those salts containing metals selected from the group consisting of Group I metals, Group II metals, Al, Pb, Sn, Co and Ni. Examples of compounds include the oxides, hydroxides, alcoholates, and carbonates of Li, Na, K, Ca, Ba, Pb, Al, Sn, Ni and others. While reactive metals may also be employed, it is generally more convenient, and often more economical to employ the metal salts as reactants. An extensive listing of reactive metal compounds useful for preparing the metal salts of the hydrocarbyl group substituted carboxylic composition is provided in U.S. Pat. No. 3,271,310 (LeSuer) which is expressly incorporated herein by reference.

Reactive metal compounds useful as (c) for the formation of complexes with the reaction products of the acylating reagents of this invention and amines are disclosed in U.S. Pat. No. 3,306,908. Complex-forming metal reactants useful as (c) include the nitrates, nitrites, halides, carboxylates, phosphates, phosphites, sulfates, sulfites, carbonates, borates, and oxides of cadmium as well as metals having atomic numbers from 24 to 30 (including chromium, manganese, iron, cobalt, nickel, copper and zinc). These metals are the so-called transition or coordination metals, i.e., they are capable of forming complexes by means of their secondary or coordination valence. Specific examples of the complex-forming metal compounds useful as the reactant in this invention are cobalt, cobaltous oxide, cobaltous chloride, cobaltic chloride, chromous acetate, chromic acetate, chromic sulfate, chromic hexanoate, manganous acetate, manganous benzoate, manganous nitrate, ferrous acetate, ferric benzoate, ferrous bromide, nickel nitrate, nickel dioleate, nickel stearate, cupric benzoate, cupric formate, cupric nitrite; zinc benzoate, zinc borate, zinc chromate, cadmium benzoate, cadmium carbonate, cadmium butyrate. Hydrates of the above compounds are especially convenient for use in the process of this invention.

U.S. Pat. No. 3,306,908 is expressly incorporated herein by reference for its discussion of reactive metal compounds suitable for forming such complexes and its disclosure of processes for preparing the complexes. Basically, those processes are applicable to the carboxylic derivative compositions of the acylating reagents of this invention with the amines as described above by substituting, or on an equivalent basis, the acylating reagents of this invention with the high molecular weight carboxylic acid acylating agents disclosed in U.S. Pat. No. 3,306,908. The ratio of equivalents of the acylated amine thus produced and the complex-forming metal reactant remains the same as disclosed in U.S. Pat. No. 3,306,908.

The following examples illustrate carboxylic derivative compositions of this invention. Temperatures, pressures, and amounts are as set forth hereinabove. Filtrations employ a diatomaceous earth filter aid.

EXAMPLE A

A reactor is charged with 300 parts of the product of Example 8 and 250 parts mineral oil. The materials are heated, under N$_2$, to 110° C. whereupon 18.98 parts of an ethylene polyamine mixture having an equivalent weight of 39.78 are added over 0.2 hour. The materials are heated to 160° C. over 1.25 hour and are maintained at temperature for 13 hours while removing 3 parts by volume distillate. The materials are filtered at 120° C. The reactor is rinsed with 53.68 parts mineral oil and the rinsings are filtered and combined with the first filtrate. The filtrate contains 0.989% N, has saponification number=19.53 and total base number=15.06.

EXAMPLE B

A reactor is charged with 300 parts of the product of Example 10 and 305.75 parts of mineral oil. The materials are heated, under $N_2$, to 110° C. whereupon 19.19 parts of an ethylene polyamine bottoms containing 31.5% N (HPA-X, Union Carbide) are added over 0.2 hour. The materials are heated to 170° C. over 3 hours and maintained at temperature for 8.25 hour. The materials are filtered with a diatomaceous earth filter aid at 130° C. The filtrate contains 0.995% N, saponification number=20.29 and total base number=18.59.

EXAMPLE C

The procedure of Example B is repeated with 300 parts of the product of Example 10, 24.41 parts HPA-X polyamine bottoms and 310.97 parts mineral oil. The filtrate contains 1.185% N, saponification number=10.56 and total base number=23.5.

EXAMPLE D

A reactor is charged with 1791 parts of the product of Example 13, 1819.58 parts mineral oil and 116.26 parts HPA-X polyamine bottoms. The materials are heated, Under $N_2$, to 170° C. over 3 hours then maintained at 170° C. for a total of 13.5 hours while collecting a total of 50.27 parts distillate. The materials are filtered at 110° C. with a diatomaceous earth filter aid. The filtrate contains 1.03% N, and total base number=16.53.

EXAMPLE E

A reactor is charged with 200 parts of the product of Example 12, 7.38 parts HPA-X polyamine bottoms and 701.91 parts mineral oil. The materials are heated to 100° C. over 0.25 hour, then the temperature is increased to 170° C., is maintained at temperature for 1.5 hours, then temperature is increased to 180° C., is maintained for 0.5 hour, then temperature is increased to 190° C. and is maintained for 5 hours. The materials are cooled to 130° C., mixed with 17.1 parts diatomaceous earth filter aid then filtered through cloth. Filtrate has %N=0.55, Total Base No=10.52.

EXAMPLE F

A reactor is charged with 371.3 parts of the product of Example 10, 119 parts pentaerythritol and 300 parts mineral oil. To the stirred mixture are added 2 parts 70% aqueous methanesulfonic acid. The materials are heated to 210° C. and the temperature is maintained for 3 hours while removing distillate as it forms. The materials are then filtered at 100° C.

EXAMPLE G

A reactor is charged with 300 parts of the product of Example F and 4.5 parts of HPA-X polyamines bottoms. The materials are heated at 145° C. for 2 hours then collected.

EXAMPLE H

A reactor is charged with 142 parts of the product of Example 10, 60 parts mineral oil, 10 parts water and 4 parts zinc oxide. The materials are mixed and heated at 160° C. for 5 hours, vacuum stripped and filtered.

EXAMPLE I

A mixture of 100 parts of the product of Example H and 2 parts of EPA-X polyamines bottoms is mixed and heated at 150° C. for 2 hours, then collected.

The Oil of Lubricating Viscosity

The lubricating compositions of this invention employ an oil of lubricating viscosity, including natural or synthetic lubricating oils and mixtures thereof.

Natural oils include animal oils and vegetable oils (e.g. castor oil, lard oil) as well as mineral lubricating oils such as liquid petroleum oils and solvent-treated or acid treated mineral lubricating oils of the paraffinic, naphthenic or mixed paraffinic-naphthenic types. Oils of lubricating viscosity derived from coal or shale are also useful. Synthetic lubricating oils include hydrocarbon oils and halosubstituted hydrocarbon oils such as polymerized and interpolymerized olefins, etc. and mixtures thereof, alkylbenzenes, polyphenyl, (e.g., biphenyls, terphenyls, alkylated polyphenyls, etc.), alkylated diphenyl ethers and alkylated diphenyl sulfides and the derivatives, analogs and homologues thereof and the like.

Alkylene oxide polymers and interpolymers and derivatives thereof where their terminal hydroxyl groups have been modified by esterification, etherification, etc., constitute another useful class of known synthetic lubricating oils.

Another suitable class of synthetic lubricating oils that can be used comprises the esters of di- and polycarboxylic acids and those made from $C_5$ to $C_{20}$ monocarboxylic acids and polyols and polyolethers.

Other synthetic lubricating oils include liquid esters of phosphorus-containing acids, polymeric tetrahydrofurans and the like, silicon-based oils such as the polyalkyl-, polyaryl-, polyalkoxy-, or polyaryloxy-siloxane oils and silicate oils.

Unrefined, refined and redefined oils, either natural or synthetic (as well as mixtures of two or more of any of these) of the type disclosed hereinabove can be used in the compositions of the present invention. Unrefined oils are those obtained directly from natural or synthetic sources without further purification treatment. Refined oils are similar to the unrefined oils except they have been further treated in one or more purification steps to improve one or more properties. Refined oils include solvent refined oils, hydrorefined oils, hydrofinished oils, hydrotreated oils, and oils obtained by hydrocracking and hydroisomerization techniques.

Rerefined oils are obtained by processes similar to those used to obtain refined oils applied to refined oils which have been already used in service. Such rerefined oils often are additionally processed by techniques directed to removal of spent additives and oil breakdown products.

Specific examples of the above-described oils of lubricating viscosity are given in Chamberlin, III, U.S. Pat. No. 4,326,972, European Patent Publication 107,282, and A. Sequeria, Jr., Lubricant Base Oil and Wax Processing, Chapter 6, Marcel Decker, Inc., New York (1994), each of which is hereby incorporated by reference for relevant disclosures contained therein.

A basic, brief description of lubricant base oils appears in an article by D. V. Brock, "Lubrication Engineering", Volume 43, pages 184–5, March, 1987, which article is expressly incorporated herein by reference for relevant disclosures contained therein.

The Normally Liquid Fuels

As indicated hereinabove, the products of this invention may also be used as additives for normally liquid fuels.

The fuels used in the fuel compositions of this invention are well known to those skilled in the art and usually contain a major portion of a normally liquid fuel such as hydrocarbonaceous petroleum distillate fuel (e.g., motor gasoline as defined by ASTM Specifications D-439-89 and D-4814-91 and diesel fuel or fuel oil as defined in ASTM Specifications D-396-90 and D-975-91). Fuels containing non-hydrocarbonaceous materials such a alcohols, ether, organo-nitro compounds and the like, are also within the scope of this invention as are liquid fuels derived from vegetable or mineral sources. A range of alcohol and ether type compounds are described as oxygenates. Oxygenate-containing fuels are described in ASTM D-4814-91. Mixtures of any of the above-described fuels are useful.

Particularly preferred fuels are gasoline, that is, a mixture of hydrocarbons having an ASTM boiling point of 60° C. at the 10% distillation point to about 205° C. at the 90% distillation point, oxygenates, and gasoline-oxygenate blends, all as defined in the aforementioned ASTM Specifications for automotive gasolines. Most preferred is gasoline.

The fuel compositions typically contain from about 0.001% to about 2% by weight, more often up to about 0.5%, even more often up to about 0.2% by weight of the additives of this invention.

The fuel compositions of the present invention may contain other additives which are well known to those skilled in the art. These can include anti-knock agents such as tetra-alkyl lead compounds, lead scavengers such as halo-alkanes, dyes, antioxidants such as hindered phenols, rust inhibitors such as alkylated succinic acids and anhydrides and derivatives thereof, bacteriostatic agents, auxiliary dispersants and detergents, gum inhibitors, fluidizers, metal deactivators, demulsifiers, anti-icing agents and the like. The fuel compositions of this invention may be lead-containing or lead-free fuels. Preferred are lead-free fuels.

Other Additives

As mentioned, lubricating oil compositions of this invention may contain other components. The use of such additives is optional and the presence thereof in the compositions of this invention will depend on the particular use and level of performance required. Thus the other additive may be included or excluded. The compositions may comprise a zinc salt of a dithiophosphoric acid. Zinc salts of dithiophosphoric acids are often referred to as zinc dithiophosphates, zinc O,O'-dihydrocarbyl dithiophosphates, and other commonly used names. They are sometimes referred to by the abbreviation ZDP. One or more zinc salts of dithiophosphoric acids may be present in a minor amount to provide additional extreme pressure, anti-wear and anti-oxidancy performance.

In addition to zinc salts of dithiophosphoric acids discussed hereinabove, other additives that may optionally be used in the lubricating oils of this invention include, for example, auxiliary detergents and dispersants, viscosity improvers, oxidation inhibiting agents, pour point depressing agents, extreme pressure agents, anti-wear agents, color stabilizers and anti-foam agents. The above-mentioned dispersants and viscosity improvers may be used in addition to the compositions of this invention.

Auxiliary extreme pressure agents and corrosion and oxidation inhibiting agents which may be included in the compositions of the invention are exemplified by chlorinated aliphatic hydrocarbons, organic sulfides and polysulfides, phosphorus esters including dihydrocarbon and trihydrocarbon phosphites, molybdenum compounds, and the like.

Auxiliary viscosity improvers (also sometimes referred to as viscosity index improvers or viscosity modifiers) may be included in the compositions of this invention. Viscosity improvers are usually polymers, including polyisobutenes, polymethacrylic acid esters, diene polymers, polyalkyl styrenes, esterified styrene-maleic anhydride copolymers, alkenylarene-conjugated diene copolymers and polyolefins. Multifunctional viscosity improvers, other than those of the present invention, which also have dispersant and/or anti-oxidancy properties are known and may optionally be used in addition to the products of this invention. Such products are described in numerous publications including those mentioned in the Background of the Invention. Each of these publications is hereby expressly incorporated by reference.

Pour point depressants are often included in the lubricating oils described herein. See for example, page 8 of "Lubricant Additives" by C. V. Smalheer and R. Kennedy Smith (Lezius-Hiles Company Publisher, Cleveland, Ohio, 1967). Pour point depressants, techniques for their preparation and their use are described in U.S. Pat. Nos. 2,387,501; 2,015,748; 2,655,479; 1,815,022; 2,191,498; 2,666,748; 2,721,877; 2,721,878; and 3,250,715 which are expressly incorporated by reference for their relevant disclosures.

Anti-foam agents used to reduce or prevent the formation of stable foam include silicones or organic polymers. Examples of these and additional anti-foam compositions are described in "Foam Control Agents", by Henry T. Kerner (Noyes Data Corporation, 1976), pages 125–162.

Detergents and dispersants may be of the ash-producing or ashless type. The ash-producing detergents are exemplified by oil soluble neutral and basic salts of alkali or alkaline earth metals with sulfonic acids; carboxylic acids, phenols or organic phosphorus acids characterized by a least one direct carbon-to-phosphorus linkage.

The term "basic salt" is used to designate metal salts wherein the metal is present in stoichiometrically larger amounts than the organic acid radical. Basic salts and techniques for preparing and using them are well known to those skilled in the art and need not be discussed in detail here.

Ashless detergents and dispersants are so-called despite the fact that, depending on its constitution, the detergent or dispersant may upon combustion yield a nonvolatile residue such as boric oxide or phosphorus pentoxide; however, it does not ordinarily contain metal and therefore does not yield a metal-containing ash on combustion. Many types are known in the art, and are suitable for use in the lubricants of this invention. The following are illustrative:

(1) Reaction products of carboxylic acids (or derivatives thereof) containing at least about 34 and preferably at least about 54 carbon atoms with nitrogen containing compounds such as amine, organic hydroxy compounds such as phenols and alcohols, and/or basic inorganic materials. Examples of these "carboxylic dispersants" are described in British Patent number 1,306,529 and in many U.S. patents including the following:

| | | |
|---|---|---|
| 3,163,603 | 3,381,022 | 3,542,680 |
| 3,184,474 | 3,399,141 | 3,567,637 |
| 3,215,707 | 3,415,750 | 3,574,101 |
| 3,219,666 | 3,433,744 | 3,576,743 |
| 3,271,310 | 3,444,170 | 3,630,904 |
| 3,272,746 | 3,448,048 | 3,632,510 |
| 3,281,357 | 3,448,049 | 3,632,511 |
| 3,306,908 | 3,451,933 | 3,697,428 |
| 3,311,558 | 3,454,607 | 3,725,441 |
| 3,316,177 | 3,467,668 | 4,194,886 |
| 3,340,281 | 3,501,405 | 4,234,435 |
| 3,341,542 | 3,522,179 | 4,491,527 |
| 3,346,493 | 3,541,012 | 5,696,060 |
| 3,351,552 | 3,541,678 | 5,696,067 |
| | | RE 26,433 |

(2) Reaction products of relatively high molecular weight aliphatic or alicyclic halides with amines, preferably polyalkylene polyamines. These may be characterized as "amine dispersants" and examples thereof are described for example, in the following U.S. patents:

| | |
|---|---|
| 3,275,554 | 3,454,555 |
| 3,438,757 | 3,565,804 |

(3) Reaction products of alkyl phenols in which the alkyl groups contains at least about 30 carbon atoms with aldehydes (especially formaldehyde) and amines (especially polyalkylene polyamines), which may be characterized as "Mannich dispersants". The materials described in the following U.S. patents are illustrative:

|  |  |
|---|---|
| 3,413,347 | 3,725,480 |
| 3,697,574 | 3,726,882 |
| 3,725,277 |  |

(4) Products obtained by post-treating the carboxylic amine or Mannich dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. patents:

|  |  |  |  |
|---|---|---|---|
| 3,036,003 | 3,282,955 | 3,493,520 | 3,639,242 |
| 3,087,936 | 3,312,619 | 3,502,677 | 3,649,229 |
| 3,200,107 | 3,366,569 | 3,513,093 | 3,649,659 |
| 3,216,936 | 3,367,943 | 3,533,945 | 3,658,836 |
| 3,254,025 | 3,373,111 | 3,539,633 | 3,697,574 |
| 3,256,185 | 3,403,102 | 3,573,010 | 3,702,757 |
| 3,278,550 | 3,442,808 | 3,579,450 | 3,703,536 |
| 3,280,234 | 3,455,831 | 3,591,598 | 3,704,308 |
| 3,281,428 | 3,455,832 | 3,600,372 | 3,708,522 |
|  |  |  | 4,234,435 |

(5) Polymers and copolymers of oil-solubilizing monomers such as decyl methacrylate, vinyl decyl ether and high molecular weight olefins with monomers containing polar substituents, e.g., aminoalkyl acrylates or methacrylates, acrylamides and poly-(oxyethylene)-substituted acrylates. These may be characterized as "polymeric dispersants" and examples thereof are disclosed in the following U.S. patents:

|  |  |
|---|---|
| 3,329,658 | 3,666,730 |
| 3,449,250 | 3,687,849 |
| 3,519,565 | 3,702,300 |

The above-noted patents are incorporated by reference herein for their disclosures of ashless dispersants.

The above-illustrated additives may each be present in lubricating compositions at a concentration of as little as 0.001% by weight, usually ranging from about 0.01% to about 20% by weight. In most instances, they each contribute from about 0.1% to about 10% by weight, more often up to about 5% by weight.

Additive Concentrates

The various compositions and other additives described herein can be added directly to the lubricant. Preferably, however, they are diluted with a substantially inert, normally liquid organic diluent such as mineral oil, naphtha, benzene, toluene or xylene, to form an additive concentrate. Preferred additive concentrates contain the diluents referred to hereinabove. These concentrates usually comprise about 0.1 to about 80% by weight of the compositions of this invention and may contain, in addition, one or more other additives known in the art or described hereinabove. Concentrations such as 15%, 20%, 30% or 50% or higher may be employed.

The following Examples illustrate several additive concentrates comprising compositions of this invention. All parts are parts by weight and, except for products of examples recited herein, amounts are on an oil or other diluent free basis.

Concentrates I–II

Each of the below listed additive concentrates is prepared by combining 7.61 parts of Zn mixed isopropyl-methyl amyl phosphorodithioate, 2.7 parts $C_{12-18}$ alkyl sulfide, 5.5 parts alkylated diphenyl amine, 1 part of sodium overbased (MR 16) polyisobutylene ($M_n \sim 1000$) substituted succinic acid, 2 parts calcium overbased (MR 11) alkyl benzene sulfonic acid, 1.54 parts magnesium overbased (MR 14.7) alkyl benzene sulfonic acid, 2.8 parts calcium overbased (MR 3.5) sulfurized alkyl phenol, 0.09 parts of a kerosene solution of a commercial silicone antifoam, 49.1 part of the indicated product of this invention and sufficient mineral oil to bring the total weight of the additive concentrate to 100 parts.

|  | Concentrate | |
|---|---|---|
|  | I | II |
| Product of Example: | A | D |

Concentrate III

An additive concentrate is prepared by combining 9.2 parts polyisobutylene ($M_n \sim 1000$) substituted succinic anhydride-ethylene polyamine reaction product, 5.8 parts of Zn mixed isopropyl-methyl amyl phosphorodithioate, 4 parts sulfurized butadiene-butyl acrylate Diels-Alder adduct, 0.5 parts alkylated diphenyl amine, 4.0 parts calcium overbased (MR 11) alkyl benzene sulfonic acid, 1.7 parts magnesium overbased (MR 14.7) alkyl benzene sulfonic acid, 64 parts calcium overbased (MR 3.5) sulfurized alkyl phenol, 0.62 parts calcium overbased (MR 2.8) alkyl benzene sulfonic acid, 2.08 parts 2,6-di-t-butyl-4-dodecyl phenol, 0.09 parts of a kerosene solution of a commercial silicone antifoam, 38.1 parts of the product of Example A and sufficient mineral oil to bring the total weight of the additive concentrate to 100 parts.

Concentrates IV and V

Each of the below listed additive concentrates is prepared by combining 4.5 parts alkylated diphenyl amine, 6.5 parts Zn mixed isopropyl-methyl amyl phosphorodithioate, 6.2 parts calcium overbased (MR 2.8) sulfurized alkyl phenol, 0.9 parts calcium overbased (MR 11) alkyl benzene snlfonic acid, 11.2 parts calcium overbased (MR 2.8) alkyl benzene sulfonic acid, 54.3 parts of the indicated product of this invention and sufficient mineral oil to bring the total weight of the additive concentrate to 100 parts.

|  | Concentrate | |
|---|---|---|
|  | IV | V |
| Product of Example: | B | C |

Lubricating Oil Compositions

The instant invention also relates to lubricating oil compositions containing the carboxylic compositions of the invention. As noted hereinabove, the carboxylic compositions of this invention may be blended directly into an oil or lubricating viscosity or, more often, are incorporated into an additive concentrate containing one or more other additives which in turn is blended into the oil.

Lubricant Examples AA–BB

SAE 5W-30 lubricating oil compositions are prepared by blending 8.5 parts of a 9% in mineral oil solution of an ethylene-propylene-dicyclopentadiene copolymer viscosity improver, 0.2 parts of a 46% in oil solution of an amine neutralized styrene-maleate copolymer, and 11 parts of the indicated additive concentrate in sufficient mineral oil (Exxon stocks) to make 100 parts of lubricating oil composition.

| Lubricant | | |
|---|---|---|
| | AA | BB |
| Product of Example: | Concentrate I | Concentrate II |

Lubricant Examples CC–DD

SAE 15W-40 lubricating oil compositions are prepared by blending 8.5 parts of a 9.5% in oil solution of an ethylene propylene copolymer viscosity improver, 0.12% of a 53% in oil solution of a polymethacrylate viscosity improver, and 13.2 parts of the indicated additive concentrate in sufficient mineral oil (Exxon stocks) to make 100 parts of lubricating oil composition.

| Lubricant | | |
|---|---|---|
| | CC | DD |
| Product of Example: | Concentrate IV | Concentrate V |

Lubricant Example EE

An SAE 10W40 lubricating oil composition is prepared by blending 10.5 parts of a 12.5% in oil solution of an ethylene-propylene copolymer, 0.12% of a 53% in oil solution of a polymethacrylate viscosity improver, and 14.4 parts of Additive Concentrate III into sufficient mineral oil (Esso 145N) to make 100 parts of lubricating oil composition.

It is known that some of the materials described above may interact in the final formulation, so that the components of the final formulation may be different from those that are initially added. For instance, metal ions (of, e.g., a detergent) can migrate to other acidic sites of other molecules. The products formed thereby, including the products formed upon employing the composition of the present invention in its intended use, may not susceptible of easy description. Nevertheless, all such modifications and reaction products are included within the scope of the present invention; the present invention encompasses the composition prepared by admixing the components described above.

Each of the documents referred to above is incorporated herein by reference. Except in the examples, or where otherwise explicitly indicated, all numerical quantities in this description specifying amounts of materials, reaction conditions, molecular weights, number of carbon atoms, and the like, are to be understood as modified by the word "about". Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil which may be customarily present in the commercial material, unless otherwise indicated. It is to be understood that the upper and lower amount, range, and ratio limits set forth herein may be independently combined. As used herein, the expression "consisting essentially of" permits the inclusion of substances which do not materially affect the basic and novel characteristics of the composition under consideration.

While the invention has been explained in relation to its preferred embodiments, it is to be understood that various modifications thereof will become apparent to those skilled in the art upon reading the specification. Therefore, it is to be understood that the invention disclosed herein is intended to cover such modifications that fall within the scope of the appended claims.

What is claimed is:

1. A hydrocarbyl group substituted carboxylic composition derived from
    (A) an olefinically unsaturated hydrocarbon, said hydrocarbon having at least one allylic hydrogen atom, wherein said hydrocarbon comprises a) a hydrocarbon containing at least 8 carbon atoms or b) a polyolefin derived from homopolymerizing or interpolymerizing $C_{2-28}$ olefin(s) and mixtures thereof, optionally with at least one polyene and
    (B) an α,β-unsaturated carboxylic compound prepared by reacting
        (1) an active methylene compound of the formula

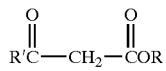

and
        (2) a carbonyl compound of the general formula

wherein $R^a$ is H or hydrocarbyl and $R^b$ is a member of the group consisting of H, hydrocarbyl and

wherein each R' is independently R or OR and each R is, independently, H or a hydrocarbyl group; and lower alkyl acetals, ketals, hemiacetals and hemiketals of the carbonyl compound (2).

2. The carboxylic composition of claim 1 wherein said hydrocarbon is a polyolefin derived from homopolymerizing or interpolymerizing $C_{2-28}$ olefin(s) or mixtures thereof, optionally with at least one polygon.

3. The carboxylic composition of claim 2 wherein the olefinically unsaturated hydrocarbon is a homopolymer derived from olefins containing from 2 to 4 carbon atoms.

4. The carboxylic composition of claim 3 wherein the polyolefin is a polybutene having $\overline{M}_n$ ranging from about 300 to about 5,000.

5. The carboxylic composition of claim 4 wherein the polybutene is a polyisobutylene wherein at least about 30% of the polymeric chains have terminal vinylidene groups.

6. The carboxylic composition of claim 5 wherein at least about 70% of the polymeric chains have terminal vinylidene groups.

7. The carboxylic composition of claim 2 wherein the polyolefin is an ethylene-propylene copolymer having $\overline{M}_n$ ranging from about 300 to about 10,000 and the ethylene content ranges from about 25% to about 75% by weight.

8. The carboxylic composition of claim 2 wherein the polyolefin is a terpolymer derived from ethylene, at least one $C_{3-28}$ olefin and a polyene, said terpolymer having $\overline{M}_n$ ranging from about 1,000 to about 10,000.

9. The carboxylic composition of claim 8 wherein the polyene comprises at least one cyclic diene.

10. The carboxylic composition of claim 8 wherein the polyene comprises at least one of dicyclopentadiene and an alkylidene norbornene.

11. The carboxylic composition of claim 8 wherein the ethylene content of the terpolymer ranges from about 25% to about 85% by weight and the non-conjugated polyene content ranges from about 0.5% to about 15% by weight.

12. The carboxylic composition of claim 1 wherein the olefinically unsaturated hydrocarbon has $\overline{M}_n$ ranging from about 300 to about 10,000.

13. The carboxylic composition of claim 1 wherein the active methylene compound comprises a di-lower alkyl malonate.

14. The carboxylic composition of claim 13 wherein the di-lower alkyl malonate comprises dimethyl malonate, diethyl malonate or methyl ethyl malonate.

15. The carboxylic composition of claim 1 wherein the active methylene compound comprises a lower alkyl acetoacetate.

16. The carboxylic composition of claim 15 wherein the lower alkyl acetoacetate comprises methyl- or ethyl-acetoacetate.

17. The carboxylic composition of claim 1 wherein the carbonyl compound (2) comprises an aldehyde wherein $R^a$ is H and $R^b$ is H or lower alkyl.

18. The carboxylic composition of claim 17 wherein the aldehyde is formaldehyde.

19. The carboxylic composition of claim 1 wherein the carbonyl compound (2) comprises a ketone wherein each of $R^a$ and $R^b$ is a lower alkyl group.

20. A hydrocarbyl group substituted carboxylic derivative composition prepared by reacting at least one hydrocarbyl group substituted carboxylic composition according to claim 1 with a reactant selected from the group consisting of (a) amines characterized by the presence within their structure of at least one condensable H—N<group, (b) alcohols, (c) reactive metal or reactive metal compounds, and (d) a combination of two or more of any of (a) through (c), the components of (d) being reacted with the carboxylic composition simultaneously or sequentially, in any order.

21. An additive concentrate for preparing lubricating oil and fuel compositions comprising from about 20% to about 99% by weight of a normally liquid, substantially inert organic diluent and from about 1% to about 80% by weight of at least one carboxylic derivative composition of claim 20.

22. An additive concentrate for preparing lubricating oil and fuel compositions comprising from about 20% to about 99% by weight of a normally liquid, substantially inert organic diluent and from about 1% to about 80% by weight of at least one carboxylic composition of claim 1.

23. A hydrocarbyl group substituted carboxylic composition derived from
(A) an olefinically unsaturated hydrocarbon, said hydrocarbon having at least one allylic hydrogen atom, and
(B) a carbonyl compound having the general formula

or a lower alkyl hemiacetals thereof, wherein each R' is independently R or OR and each R is, independently, H or a hydrocarbyl group.

24. The carboxylic composition of claim 23 wherein R is independently H or lower alkyl.

25. The carboxylic composition of claim 24 wherein the carbonyl compound is glyoxylic acid or the hydrate thereof.

26. The carboxylic composition of claim 24 wherein the carbonyl compound is a lower alkyl ester of glyoxylic acid.

27. The carboxylic composition of claim 24 wherein the carbonyl compound is a lower alkyl hemiacetal of a lower alkyl glyoxylate.

28. The carboxylic composition of claim 27 wherein the carbonyl compound is the methyl hemiacetal of methyl glyoxylate.

29. A hydrocarbyl group substituted polycarboxylic composition derived from
(A) an olefinically unsaturated hydrocarbon said hydrocarbon having at least one allylic hydrogen atom, and
(B) an α,β-unsaturated polycarboxylic compound prepared by reacting glyoxylic acid or a reactive equivalent thereof with an active methylene compound of the formula

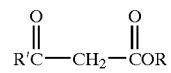

wherein R' is selected from R and OR and each R is, independently, H or lower alkyl.

30. A hydrocarbyl group substituted polycarboxylic composition derived from
(A) at least one olefinically unsaturated hydrocarbon having at least one allylic hydrogen atom, wherein said hydrocarbon comprises a) a hydrocarbon containing a least 8 carbon atoms or b) a polyolefin derived from homopolymerizing or interpolymerizing $C_{2-28}$ olefin(s) or mixtures thereof, optionally with at least one polyene and
(B) an α,β-unsaturated polycarboxylic compound of the general formula

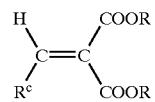

wherein $R^C$ is R;

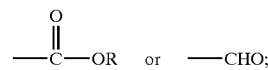

and each R is, independently, H or hydrocarbyl.

31. The carboxylic composition of claim 30 wherein the polycarboxylic compound (B) is tri(lower alkyl) ethylenetricarboxylate.

* * * * *